United States Patent
Fatemi et al.

(10) Patent No.: US 10,940,771 B1
(45) Date of Patent: Mar. 9, 2021

(54) OPTIMIZED OPERATION OF ELECTRIC PROPULSION SYSTEM HAVING RECONFIGURABLE SERIES/PARALLEL VOLTAGE SOURCE

(71) Applicant: GM GLOBAL TECHNOLOGY OPERATIONS LLC, Detroit, MI (US)

(72) Inventors: Alireza Fatemi, Canton, MI (US); Thomas W. Nehl, Shelby Township, MI (US); Chandra S. Namuduri, Troy, MI (US); Lei Hao, Troy, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/656,048

(22) Filed: Oct. 17, 2019

(51) Int. Cl.
| | |
|---|---|
| *H02P 1/00* | (2006.01) |
| *B60L 58/19* | (2019.01) |
| *B60L 50/60* | (2019.01) |
| *B60L 15/20* | (2006.01) |
| *B60K 1/00* | (2006.01) |
| *B60K 1/04* | (2019.01) |

(52) U.S. Cl.
CPC ............... *B60L 58/19* (2019.02); *B60L 15/20* (2013.01); *B60L 50/66* (2019.02); *H02P 1/00* (2013.01); *B60K 1/04* (2013.01); *B60K 2001/006* (2013.01)

(58) Field of Classification Search
CPC ........ H02P 7/2825; H02P 7/2985; H02P 1/00; B60L 58/19; B60L 50/66; B60L 15/20; B60K 1/04; B60K 2001/006
See application file for complete search history.

(56) References Cited

U.S. PATENT DOCUMENTS 4,052,647 A * 10/1977 Thompson ............ H02P 7/2985
318/139
2019/0165713 A1 5/2019 Namuduri et al.

* cited by examiner

*Primary Examiner* — Karen Masih
(74) *Attorney, Agent, or Firm* — Quinn IP Law

(57) ABSTRACT

An electric propulsion system includes a polyphase rotary electric machine that imparts motor torque to a load, a traction power inverter module ("TPIM") connected to the electric machine, a reconfigurable energy storage system ("RESS") connected to the TPIM, and a controller. The RESS has multiple battery modules and a switching circuit. The battery modules are connectable in a series-connected ("P-connected") configuration at a first/low battery voltage level, and a series-connected ("S-connected") configuration at a second/high battery voltage level that exceeds the first voltage. The controller determines power losses of the electric propulsion system at the first and second battery voltage levels, receives a commanded output torque and output speed of the electric machine, and selects the S-connected or P-connected configuration based on the predetermined power loss and commanded output torque and speed.

20 Claims, 8 Drawing Sheets

OPTIMIZED OPERATION OF ELECTRIC PROPULSION SYSTEM HAVING RECONFIGURABLE SERIES/PARALLEL VOLTAGE SOURCE

INTRODUCTION

The present disclosure relates to electric propulsion systems for battery electric vehicles, hybrid electric vehicles, and other electrically-propelled mobile platforms. Electric propulsion systems include one or more high-voltage polyphase/alternating current ("AC") rotary electric machines. The phase windings of such electric machines are sequentially energized using an onboard voltage source, typically a multi-cell high-voltage battery pack that outputs a direct current ("DC") battery voltage to the electric machine via a power inverter. High-power mobile applications traditionally utilize a single battery pack to provide an application-suitable battery voltage level, with the battery pack being selectively rechargeable in some configurations using an offboard AC or DC charging station.

Relative to the above-noted single battery pack, certain emerging reconfigurable battery pack configurations seek to improve utilization of higher charging voltages, e.g., from DC fast-charging stations. For instance, a reconfigurable battery pack may be equipped with multiple battery modules that are selectively connected in parallel or series as needed. As will be appreciated, a series-connected ("S-connected") configuration increases the battery voltage relative to a parallel-connected ("P-connected") configuration. During a DC fast-charging process, S-connected battery modules are able to receive a higher DC charging voltage relative to P-connected battery modules. Likewise, the electric propulsion system, when properly equipped to battery voltages delivered in the S-connected configuration, may enjoy higher performance propulsion modes.

SUMMARY

An electric propulsion system is disclosed herein that includes a rechargeable and reconfigurable energy storage system ("RESS") of the type noted generally above, such as a multi-module battery pack connectable in series or parallel, along with an electric machine and a controller configured to optimize operation of the electric propulsion system according to the method set forth herein. The controller is equipped with the necessary control logic/software and associated hardware for switching between first/low and second/high battery voltage levels for maximum drive cycle efficiency or high-performance operation, as desired. A default operating mode may be platform-specific and adjustable in real-time based on detected faults or limitations, e.g., in electrical and/or thermal regulation performance.

The RESS in an exemplary embodiment includes multiple battery modules that are selectively connectable in a parallel-connected ("P-connected") configuration to provide the first/low battery voltage level, which is abbreviated "$V_L$" herein. The same battery modules are selectively connected in a series-connected ("S-connected") configuration to provide the second/high battery voltage level, with the second battery voltage level being high relative to the first/low battery voltage and abbreviated "$V_H$". As used herein, "low" and "high" are relative, with the second/high battery voltage level $V_H$ being at least twice the magnitude of the first/low battery voltage level $V_L$. In a non-limiting exemplary embodiment, the first/low battery voltage level is about 250V, e.g., in a range of at least 250V to 350V, and the second/high battery voltage level is about 500V, e.g., at least 500V to 700V, with other voltages or voltage ranges being possible in other configurations.

The controller is configured to select between and thereby establish the S-connected or P-connected configuration, with this selection achieved via the present method using predetermined power losses incurred in each of the two configurations. Use of the present method allows the controller to simultaneously increase drive cycle efficiency and performance relative to a baseline operation of the electric powertrain system conducted exclusively at the first/low voltage level.

As will be appreciated by those of ordinary skill in the art, wide torque band operation of a rotary electric machine is limited by the available battery voltage. This is particularly true of permanent magnet ("PM")-type electric traction motors used often for generating torque for propelling a vehicle or other high-power mobile platform. For example, a limited battery voltage or DC bus voltage may trigger the need to perform aggressive flux-weakening or field-weakening operations. However, such operations tend to increase electrical losses while imposing performance penalties. On the other hand, operating at a consistently high battery voltage level may result in additional losses, particularly at lower machine speeds, or may stress electric machine components, e.g., the machine's insulation system or mechanical assembly. The controller is therefore configured to optimize overall performance via control of the RESS in order to adapt to platform-specific torque and speed requirements while minimizing drive cycle losses.

The electric propulsion system describe herein also includes a traction power inverter module ("TPIM"). A controller, which may be programmed with predetermined baseline power losses of the electric propulsion system at each of the first/low and second/high battery voltage levels, selects one of the S-connected or P-connected configurations based on the baseline power losses, the commanded output torque, and the commanded output speed. The controller may select the S-connected configuration or the P-connected configuration based at least in part on whether the commanded output speed exceeds a calibrated corner speed, i.e., a machine speed above which an actual output torque of the electric machine tapers toward a minimum torque value, as will be appreciated by those of ordinary skill in the art.

The controller may select the S-connected configuration when the commanded output speed exceeds the corner speed and the commanded output torque is less than a calibrated maximum torque at the second/high voltage level. The controller may select the P-connected configuration when the commanded output speed is less than the corner speed, the commanded output torque is less than the calibrated maximum torque at the first/low voltage level of the P-connected configuration, and the power loss at the first/low voltage level of the P-connected configuration is less than the power loss at the second/high voltage level of the S-connected configuration.

Absent a cooling and/or electrical fault or limitation of the electric propulsion system, the controller may select the S-connected configuration according to a default speed-based torque and power operating profile. In response to the detected fault or limitation, the controller may select the S-connected or P-connected configuration according to at least one additional speed-based torque and power operating profile. In such an embodiment, the speed-based torque and power operating profile includes a higher peak power level and a higher minimum torque level relative to the at least one additional speed-based torque and power operating profile across a predetermined speed range of the electric machine.

The electric propulsion system may include a cooling system configured to regulate temperature of the RESS and associated power electronics, including cooling of the battery cells, the TPIM, and/or the electric machine as the need arises. In such an embodiment, the fault or limitation may include a fault or limitation of the cooling system.

The at least one additional speed-based torque and power operating profile in some configurations includes first and second additional speed-based torque and power operating profiles. The first additional profile has a higher peak power level and minimum torque level than the second additional profile. The electric machine operates according to the first additional profile in response to the fault or limitation of the cooling system and operates according to the second additional profile in response to a fault or limitation of the RESS and/or the cooling system.

The load may optionally include road wheels connected to the electric machine, for instance in a motor vehicle application.

A method is also disclosed herein for optimizing drive operation of the electric propulsion system described above. In an exemplary embodiment, the method includes receiving, via the controller, a commanded output torque and speed of the electric machine, and thereafter determining a corresponding power loss of the electric propulsion system at each of the first/low and second/high voltage levels. The method includes selecting the S-connected or P-connected configuration via control of the switching circuit, with the controller deciding which of the two configurations to establish based on the baseline power loss, the commanded output torque, and the commanded output speed. The baseline power losses may be scaled in real-time based on changing conditions such as a temperature as noted herein.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
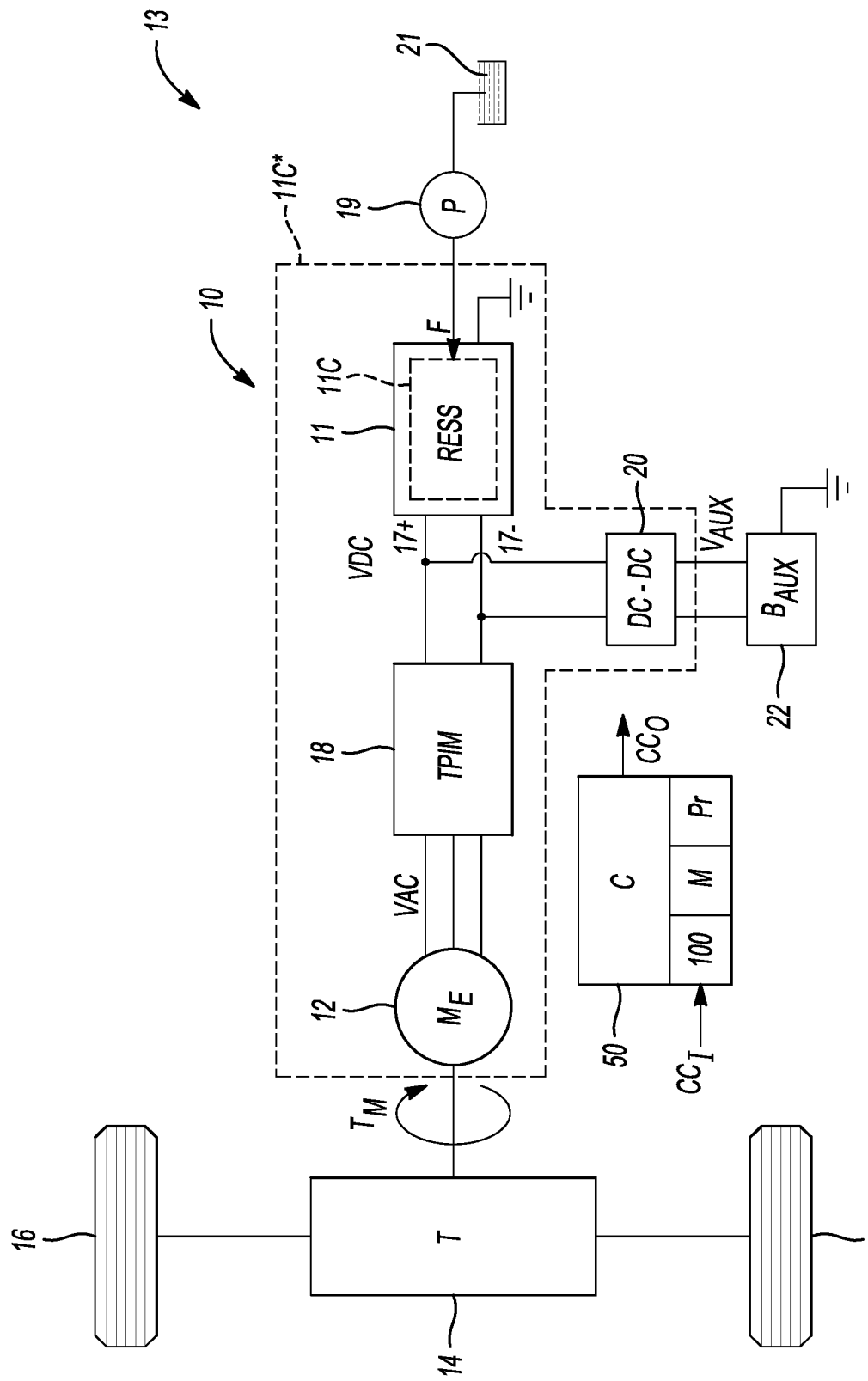
FIG. 1 is a schematic illustration of an example mobile platform having an electric propulsion system and a controller configured to perform an optimization method as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 2B:
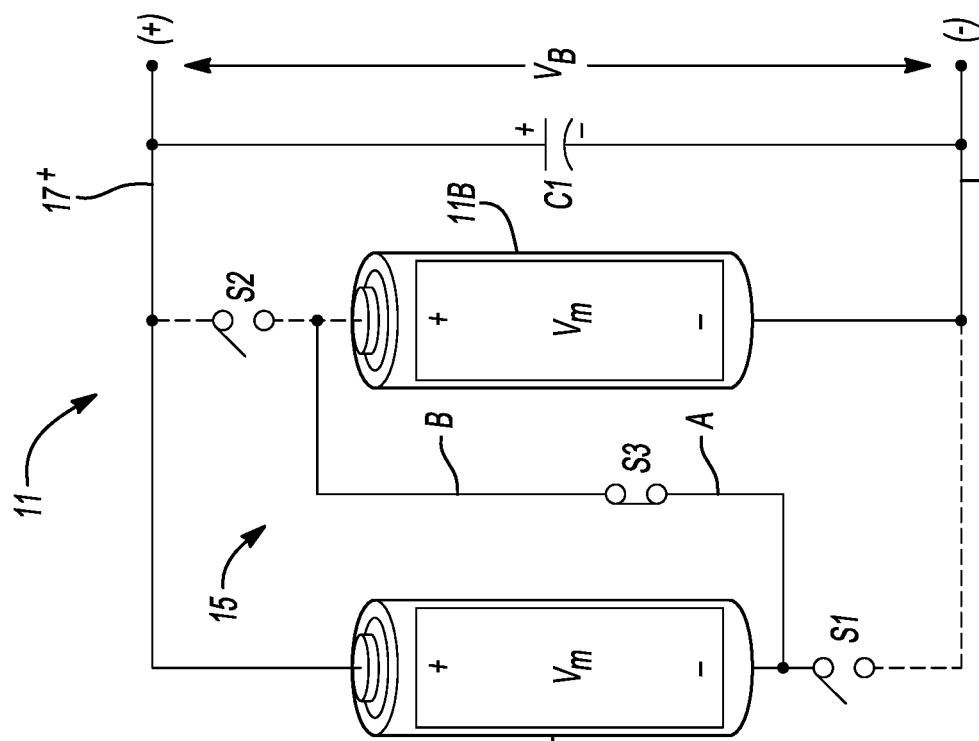
FIGS. 2A and 2B are schematic illustrations of a reconfigurable energy storage system ("RESS") in the form of a multi-cell battery pack.
Figure 2A:
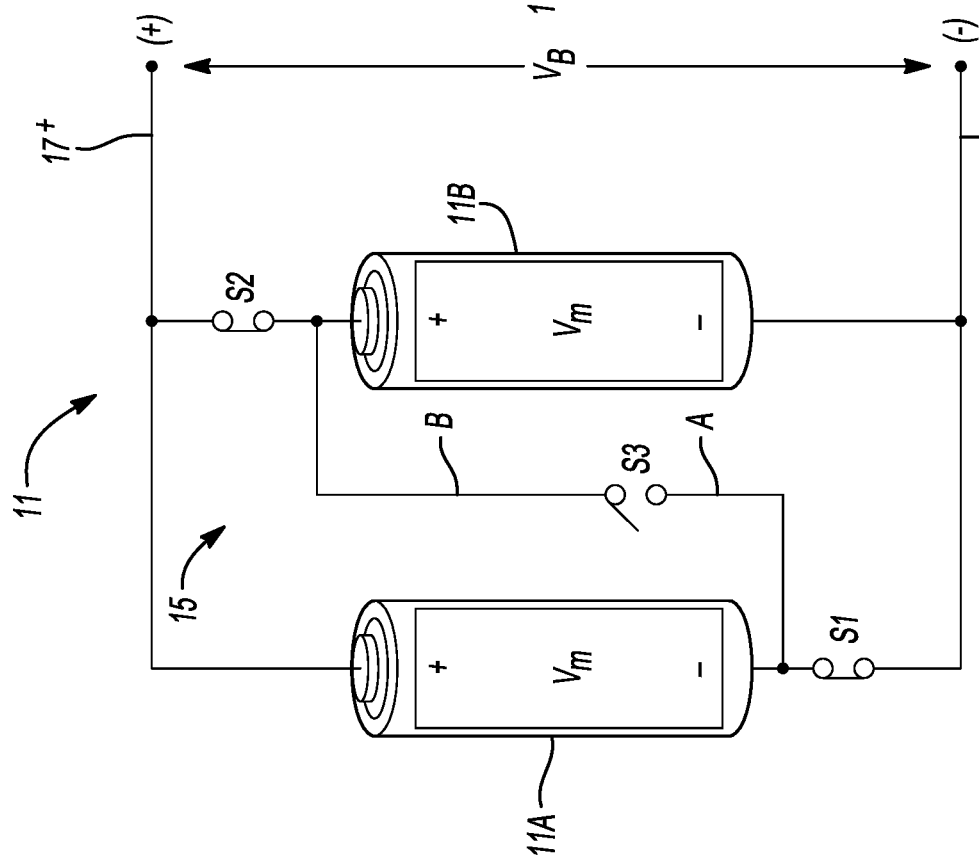

Referring to the drawings, wherein like reference numbers refer to the same or like components in the several Figures, an electric propulsion system 10 is disclosed herein that includes a reconfigurable energy storage system ("RESS") 11 and a rotary electric machine ("$M_E$") 12. The electric propulsion system 10 may be used as part of a mobile platform 13, e.g., a battery electric motor vehicle or robot. The RESS 11, as described below with reference to FIGS. 2A and 2B, is selectively configurable in a parallel-connected ("P-connected") or series-connected ("S-connected") configuration to respectively provide a low or high battery voltage across positive and negative bus rails $17^+$ and $17^-$, with the battery voltage level abbreviated "$V_B$" in FIGS. 2A and 2B.

A controller (C) 50 forms an integral part of the electric propulsion system 10. As described in detail below with particular reference to FIGS. 3-7, the controller 50 is configured to execute instructions embodying a method 100 based on baseline or scaled baseline power losses when selecting one of the S-connected or P-connected configurations of the RESS 11. Mode selection according to the method 100 is intended to optimize overall efficiency and performance by minimizing the power losses, and by accommodating possible fault modes related to cooling and/or electrical operation of the RESS 11 and other power electronics.

The controller 50 includes a processor ("Pr") and memory (M). The memory (M) includes tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry.

In executing the method 100, the controller 50 receives input signals (arrow $CC_I$) indicative of an operator-requested or autonomously-requested or commanded output torque and speed of the electric machine 12, as well as predetermined power losses, a calibrated maximum torque, a current speed, and a corner speed of the electric machine 12 as described herein. The input signals (arrow $CC_I$) may include fault and/or limitation conditions related to thermal management and electrical health of the RESS 11 and other power electronics. In response to the input signals (arrow $CC_I$), the controller 50 outputs control signals (arrow $CC_O$) to a switching control circuit 15 (see FIGS. 2A and 2B) to select between the S-connected and P-connected configurations of the RESS 11, with this control action occurring based on predetermined power losses and the commanded output torque and speed of the electric machine 12.

The RESS 11 shown in FIG. 1 includes a cooling system 11C operable for regulating the temperature of the RESS 11 and associated power electronics. While shown schematically for illustrative simplicity, the cooling system 11C may include coolant channels and/or conduit, heat-radiating cooling fins and/or plates, and other structure suitable for directing coolant (arrow F) from a coolant supply 21 through the RESS 11 and other components as noted herein. For instance, a coolant pump (P) 19 may be used to circulate the coolant (arrow F) through or around constituent battery cells (not shown) of the RESS 11. Such a cooling system 11C may also extend to other electronic components in FIG. 1, e.g., as cooling system 11C*, such as a rotary electric machine 12, a traction power inverter module ("TPIM") 18, and a direct-current-to-direct current ("DC-DC") converter 20, and therefore the boundaries of the cooling system 11C may extend beyond the envelope of the RESS 11, as will be appreciated by those of ordinary skill in the art. Likewise, the term "cooling system 11C" may encompass multiple interconnected or separate cooling subsystems or loops, such as one for the RESS 11, the TPIM 18, the electric machine 12, the converter 20, etc.

The electric machine 12 is mechanically connected to a transmission ("T") 14, which in turn may be connected to a set of road wheels 16. Motor torque (arrow $T_M$) from the electric machine 12 is transmitted via the transmission 14 to the road wheels 16 to power the road wheels 16 and thereby propel the mobile platform 13. The electric machine 12 as shown is embodied as a polyphase/alternating-current ("AC") device having phase leads connected to an AC-side of the TPIM 18, such that the TPIM 18 outputs an AC voltage ("VAC") to phase leads of the electric machine 12. As will be appreciated, power inverter modules such as the TPIM 18 include internal IGBTs, MOSFETs, or other applicable-suitable semiconductor switches each having a corresponding ON/OFF state that is controlled via pulse-width modulation ("PWM"), pulse-density modulation ("PDM"), or another switching control technique.

A DC-side of the TPIM 18 is also connected to the RESS 11 via the positive and negative bus rails $17^+$ and $17^-$, respectively, such that a DC voltage ("VDC") is present across the bus rails $17^+$ and $17^-$, with the voltage as measured across the output terminals (not shown) of the RESS 11 referred to hereinafter as the battery voltage, i.e., $V_B$ of FIGS. 2A and 2B. The DC-DC converter 20, also referred to in the art as an auxiliary power module, may be employed to selectively reduce the DC bus voltage to auxiliary voltage ("$V_{AUX}$") levels, typically 12-15V. An auxiliary battery ("$B_{AUX}$") 22 such as a lead-acid battery may be connected to the DC-DC converter 20 and used to power auxiliary or low-voltage accessories (not shown) aboard the mobile platform 13.

As will be appreciated, a battery pack with a relatively high C-rate, i.e., the particular rate at which the battery pack is charged or discharged, produce more energy per battery cell relative to a battery pack having a relatively low C-rate, with the concept of C-rate being roughly analogous to the battery pack's amp hour rating. The RESS 11, if configured with a high C-rate, may at times experience faults or loads on the cooling system 11C and/or the battery cells and other electronic hardware components of the RESS 11.

For example, the cooling system 11C shown schematically in FIG. 1 may be unable to handle the full thermal load of the TPIM 18, the electric machine 12, and the RESS 11, such as during sustained operation of the electric propulsion system 10 in hot ambient weather conditions, when the load is high, etc. Overheating can likewise degrade the C-rate of the RESS 11. The controller 50 is therefore programmed to account for such faults and conditions of the cooling system 11C or hardware of the RESS 11 when selecting between the available P-connected and S-connected configurations, with the controller 50 making the configuration selection based on power losses and machine speed as set forth below.

Referring briefly to FIGS. 2A and 2B, the RESS 11 includes multiple battery modules 11A and 11B, with a pair of such battery modules 11A and 11B shown for illustrative simplicity. The constituent battery cells (not shown) of the battery modules 11A and 11B may be constructed of a lithium ion, zinc-air, nickel-metal hydride, or another suitable high-energy battery chemistry. The RESS 11 is selectively reconfigured by operation of the controller 50 to provide a battery voltage ("$V_B$") on the DC voltage bus, i.e., across the positive and negative bus rails $17^+$ and $17^-$. The switching circuit 15 of the RESS 11 is configured to establish the P-connected configuration of FIG. 2A or the S-connected configuration of FIG. 2B in an optimal manner using the present method 100 in response to control signals from the controller 50.

Shown in simplified form for clarity, the switching circuit 15 includes multiple binary (on/conducting and off/non-conducting) switches S1, S2, and S3. Switch S1 is connected between the negative (−) terminal of battery module 11A and the negative bus rail $17^-$. Switch S2 is connected between the positive (+) terminal of battery module 11B and the positive bus rail $17^+$. Switch S3 is connected between the negative (−) terminal of battery module 11A and the positive (+) terminal of battery module 11B. To establish the P-connected configuration of FIG. 2A, the controller 50 commands the switches S1 and S2 to close and switch S3 to open, which in turn causes the battery voltage $V_B$ to equal the module voltage $V_m$. When an increase in the battery voltage $V_B$ is required, the controller 50 closes switch S3 and opens switches S1 and S2 to thereby establish the S-connected configuration of FIG. 2B. With two battery modules 11A and 11B shown in the simplified embodiment of FIGS. 2A and 2B, the S-connected configuration of FIG. 2B will provide a battery voltage $V_B$ that is twice the module voltage $V_m$.

As part of the present method 100, the controller 50 of FIG. 1 is programmed with predetermined or calibrated baseline electric drive losses, referred to hereinafter as power losses ("$P_L$"), for the electric propulsion system 10 for the S-connected and P-connected configurations. The baseline power losses may be ascertained offline and stored in memory (M) of the controller 50 for each of the configurations shown in FIGS. 2A and 2B as calibrated values. The baseline losses may be extracted from memory and thereafter adjusted or scaled in real-time by the controller 50. For instance, a loss scaling factor could be calculated by the controller 50 based on various system feedback values, e.g., temperature. Likewise, baseline peak torque curves as described herein may be scaled in real-time based on such calculations to properly account for different operating conditions.

For clarity, the S-connected configuration of FIG. 2A is abbreviated $V_H$ and the P-connected configuration of FIG. 2B is abbreviated $V_L$ to respectively represent the relatively high ("H") and low ("L") voltage levels of the battery voltage $V_B$. The lookup table may list various baseline power losses occurring within the electric machine 12, the TPIM 18, and the RESS 11 and other power electronics under nominal conditions at each of the possible voltage levels $V_H$ and $V_L$. Such power losses may be due to factors such as a resistive drop of the battery cells (not shown) housed within the RESS 11, switching and conduction losses occurring within the TPIM 18, and core and copper loses occurring within the electric machine 12. As some losses may be temperature dependent, the lookup table may be optionally indexed to different operating temperatures for improved accuracy, with the controller 50 possibly scaling the calibrated baseline values in real-time as noted above.

Figure 3:
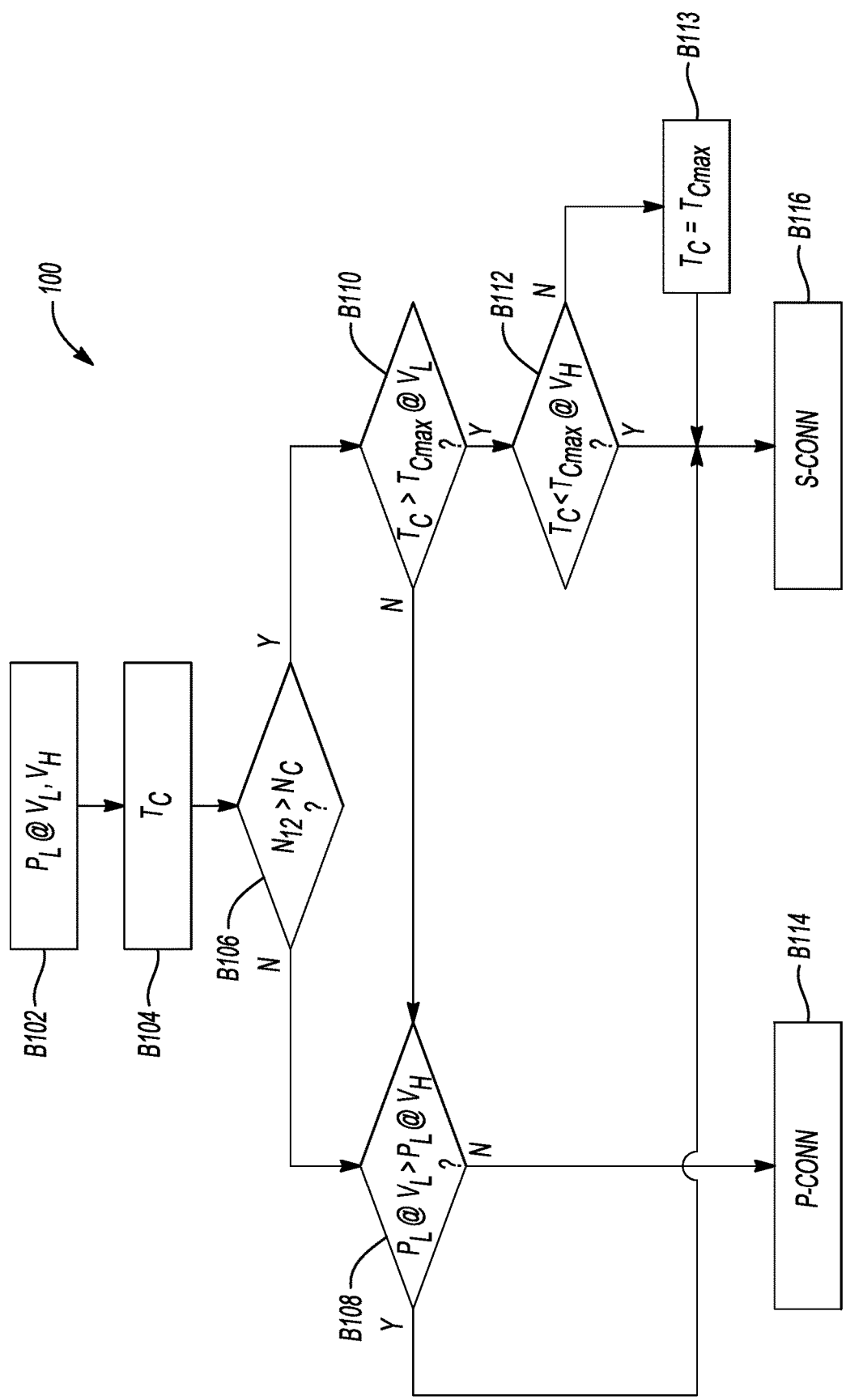
FIG. 3 is a flow chart describing an embodiment of the present method.

Referring to FIG. 3, the method 100 according to a possible embodiment commences at block B102 with the controller 50 of FIG. 1 determining the baseline power losses ("$P_L$") occurring at the above-noted first/low and second/high voltage levels $V_L$ and $V_H$, respectively. Block B102 may entail extracting recorded information from the above-described lookup table. The controller 50 may, as part of block B102, thereafter scale the baseline power losses, e.g., based on ambient or machine temperature as noted above. In a non-limiting illustrative embodiment in which the two exemplary battery modules 11A and 11B of FIGS. 2A and 2B are used, the first/low voltage level $V_L$ when operating in the P-connected configuration of FIG. 2B is in a range of at least 250V to 400V. In the same embodiment, the second/high voltage level $V_H$ in the S-connected configuration of FIG. 2A is in a range of at least 500V to 800V. Such voltage levels may be useful with emerging DC fast-charging stations and higher-power embodiments of the electric propulsion system 10 shown in FIG. 1. The method 100 proceeds to block B104 once the controller 50 has determined the power losses at the possible battery voltage levels.

Block B104 entails receiving a commanded output torque ("$T_C$") indicative of an operator-requested or autonomously-requested output torque level from the electric machine 12. As will be appreciated, machine torque is often requested using input devices such as accelerator pedals, and/or the machine torque may be calculated autonomously or semi-autonomously in real-time by the controller 50 in driverless or driver-assisted applications. The method 100 proceeds to block B106 when the commanded torque is received or otherwise determined by the controller 50.

At block B106, the controller 50 receives a commanded output speed ("$N_{12}$") of the electric machine 12 shown in FIG. 1, and then compares this speed value to a predetermined corner speed ("$N_C$") of the electric machine 12. As will be appreciated by those of ordinary skill in the art, the term "corner speed" refers to the rotational speed of the electric machine 12, i.e., a rotor hub and shaft (not shown) thereof, above which a maximum torque available from the electric machine 12 begins to taper off, i.e., decrease toward a calibrated minimum torque value. Thus, an increase in rotary speed of the electric machine 12 above the corner speed does not produce additional torque. The method 100 proceeds to block B108 when the rotational speed is less than the corner speed, and to block B110 when the rotational speed exceeds the corner speed ("$N_{12}>N_C$").

Block B108 of the method 100 includes comparing power losses expected at the first/low voltage level $V_L$ to scaled power losses expected to occur at the second/high voltage level $V_H$ in order to determine whether the power losses occurring at the first/low voltage level $V_L$ exceed the power losses at the second/high voltage level $V_H$, i.e., "$P_L$ @ $V_L>P_L$ @ $V_H$". Block B108 may include determining if limited battery power exists for sustained operation at the second/high voltage level $V_H$, for instance due to detection of a battery fault or other fault or limitation, with operation in such a state referred to below as Scenario 1. The method 100 proceeds to block B114 when the power losses incurred at the first/low voltage level $V_L$ do not exceed the power losses at the second/high voltage level $V_H$, i.e., when P-connected operation would be the more efficient option in view of faults/limitations or current operating conditions. The method 100 proceeds to block B116 in the alternative.

At block B110, the controller 50 determines whether the commanded output torque from block B104 exceeds a calibrated maximum torque at the first/low voltage level $V_L$ corresponding to the P-connected configuration of FIG. 2B, i.e., "$T_C>T_{Cmax}$ @ $V_L$". The method 100 proceeds to block B108 when the calibrated maximum torque exceeds the commanded output torque at the first/low voltage level $V_L$, and proceeds in the alternative to block B112.

At block B112, the controller 50 next determines whether the commanded torque from block B104 is less than the calibrated maximum torque of the electric machine 12 at the second/high voltage level $V_H$ ("$T_C<T_{Cmax}$@$V_H$ (Sc2, 3)", with Sc2 and Sc3 representing Scenarios 2 and 3 as described below with reference to FIGS. 4A-7. The method 100 proceeds to block B116 when such a condition is true. The method 100 proceeds in the alternative to block B113 when the commanded output torque exceeds the maximum torque at the second/high voltage level. Execution of block B112 effectively enables the controller 50 to decide whether to operate in what is referred to below as Scenario 3, i.e., a maximum/unlimited performance mode, or in the more limited performance mode of Scenario 2, with Scenario 2 possibly occurring when experiencing limited thermal capability or a fault or other limitation of the cooling system 11C.

Block B113 includes setting the commanded output torque from block B104 equal to the calibrated maximum torque $T_{Cmax}$, i.e., $T_C=T_{Cmax}$, and then proceeding to block B116.

Block B114 includes selecting the parallel-connected ("P-CONN") configuration of FIG. 2A and transitioning the RESS 11 of FIG. 1 to such a configuration, with such a control action occurring via the controller 50 and operation of the switching control circuit 15. Operation of the electric propulsion system 10 thereafter proceeds at the first/low voltage level $V_L$ in order to minimize power losses under the stated conditions.

Block B116 includes transitioning the RESS 11 of FIG. 1 to the series-connected ("S-CONN") configuration of FIG. 2B. As with block B114, such a control action occurs via operation of the controller 50 and the switching control circuit 15. Operation of the electric propulsion system 10 thereafter proceeds at the second/high voltage level $V_H$, e.g., at least 500V to 800V in the above-noted non-limiting example, to minimize power losses under the stated conditions, with the electric machine 12 of FIG. 1 powering the set of road wheels 16 as part of the method 100.

Figure 4A:
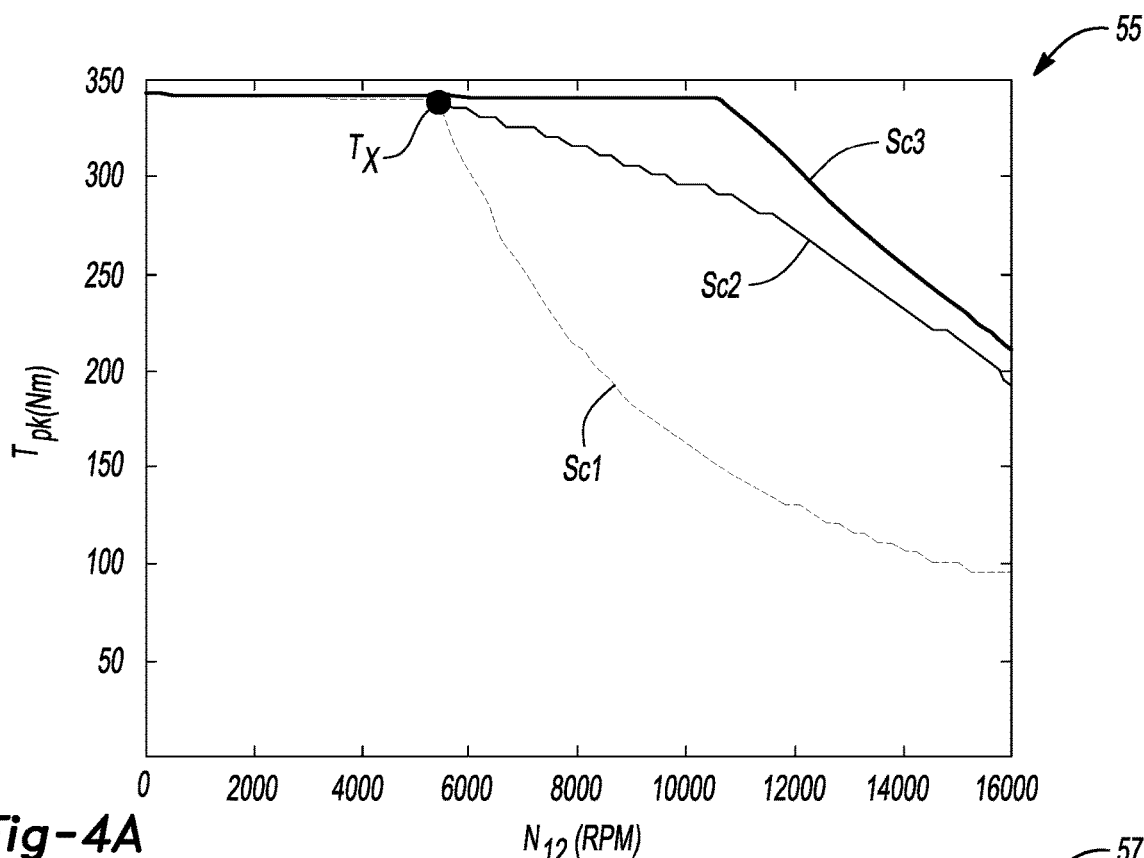
FIGS. 4A-C are exemplary peak torque-, power-, and current-versus-speed traces for three different operating scenarios enabled by the present method.
Figure 4B:
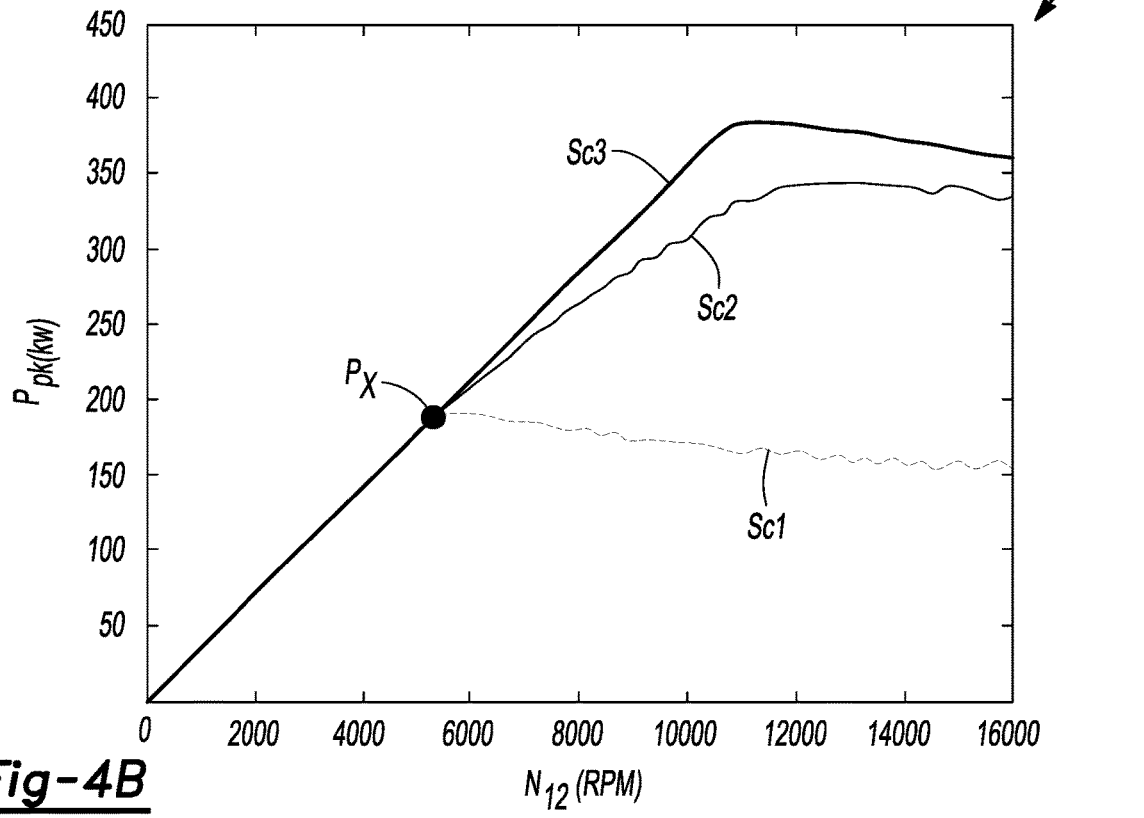
Figure 4C:
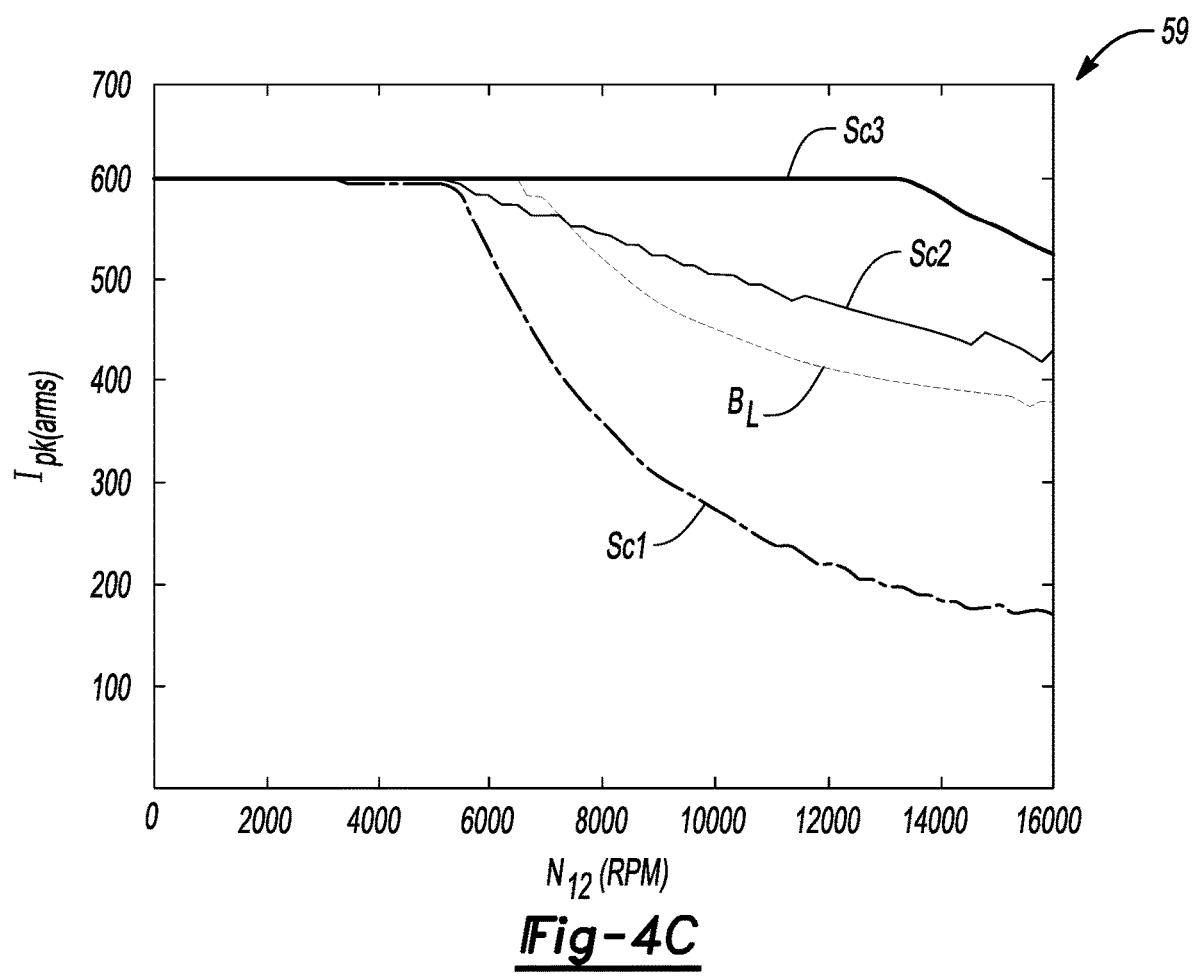

Benefits of applying the above-described method 100 to control of the electric propulsion system 10 of FIG. 1 is depicted in the representative speed plots 55, 57, and 59 of FIGS. 4A, 4B, and 4C, respectively. Rotational speed ("$N_{12}$") of the electric machine 12 is depicted in revolutions per minute ("RPM") on the horizontal axis. FIG. 4A depicts peak torque ("$T_{pk}$") in Newton-meters ("Nm") on the vertical axis, with the vertical axes of FIGS. 4B and 4C respectively representing peak power ("$P_{pk}$") in kW and peak rms current ("Ipk") in rms Amps. Relative performance is depicted for three different scenarios. With respect to such scenarios, Scenario 1 (trace Sc1) contemplates optimal loss reduction for a given torque-speed envelope. Scenario 2 (trace Sc2) contemplates higher-speed performance for a given loss envelope. Scenario 3 (trace Sc3) contemplates high-speed performance without loss or torque constraints, with Scenario 3 providing the optimal drive performance of the three scenarios in terms of torque and power.

FIG. 4A represents relative torque vs. speed performance the three scenarios when operating at the second/high voltage $V_H$ enabled by the S-connected configuration of FIG. 2B. Scenario 3 (trace Sc3) provides a maximum drive performance mode. Scenario 3 may be a default mode in some embodiments, and commanded to provide a peak torque of close to 350 Nm in the non-limiting illustrative example in which $V_H$=700V. This peak torque level is maintained up to a speed of about 10,000-12,000 RPM. Peak torque thereafter decreases toward the uppermost end of the speed range, e.g., to about 220 Nm at 16,000 RPM. Scenario 3 (trace Sc3) may be reached from block B112 of FIG. 3, and may correspond to an absence of faults or limitations in the RESS 11 or the cooling system 11C of FIG. 1.

Scenario 2 (trace Sc2) may be used in lieu of Scenario 3 (trace Sc3) in response to faults or limitations in the cooling system 11C, such as due to thermal load or demand, or due to sizing of the cooling system 11C, such that a more optimal amount of torque remains available for high-speed performance at a level short of that which is available in the maximum performance mode of Scenario 3 (trace Sc3). Scenario 2 thus still enables relatively high torque/speed performance over a given loss envelope, albeit with the trajectory of the peak torque dropping at point Tx, e.g., at about 6,000 RPM versus about 11,000 RPM for Scenario 3. At the uppermost end of the speed range, i.e., 16,000 RPM, the peak torque reaches about 200 Nm in this particular example, or about 90% of the level attained in Scenario 3. However, power losses are reduced by about 30-35 percent relative to operation in Scenario 3, for instance from 29 kW in Scenario 3 to 18.5 kW in Scenario 2. In the operating region defined between traces 3 and 2, the controller 50 may select the S-connected configuration of FIG. 2B.

Scenario 1 (trace 1) provides the lowest loss performance of the three contemplated Scenarios 1, 2, and 3, and thus may be considered a high-efficiency mode. Below trace 1, the controller 50 may operate in either the P-connected configuration of FIG. 2A or the S-connected configuration of FIG. 2B, depending on the loss determination performed in block B108. For instance, if due to a fault and/or a low C-rate construction the RESS 11 has limited battery power, the controller 50 may command operation according to Scenario 1. As with Scenario 2, the peak torque begins to drop commencing at point Tx, thereafter quickly diverging away from the capabilities of Scenarios 2 and 3 to provide a peak torque at 16,000 RPM of about 95 Nm, or less than half of the peak torques of Scenarios 2 and 3. Scenario 1 may be enabled from block B108 of FIG. 3, for instance, when power losses at the first/low voltage level $V_L$ of the P-connected configuration shown in FIG. 2A are lower than power losses incurred at the second/high voltage level $V_H$ of FIG. 2B of the S-connected configuration.

FIGS. 4B and 4C depict the same Scenarios 1, 2, and 3 with respect to peak power (FIG. 4B) and peak rms current (FIG. 4C). In FIG. 4B, for example, the peak power of Scenario 1 (trace Sc1) at point $P_X$ is about 195 kW, and occurs at approximately 5,500 RPM, with power thereafter gradually diminishing to about 150 kW in this non-limiting example. The peak power for Scenario 2 (trace Sc2) is much higher, i.e., about 340 kW, and occurs at a higher speed of about 12,000 RPM. Peak power of Scenario 3 (trace Sc3), which is the above-noted maximum power operating mode, is slightly higher than that of Scenario 2, i.e., about 380 kW at a slightly lower speed of about 11,000 RPM.

With respect to peak rms current depicted in FIG. 4C, a baseline current trace BL illustrates a typical current-speed performance at the first/low voltage level $V_L$ absent configuration and calibration of the controller 50 with method 100. Traces Sc1, Sc2, and Sc3, as with FIGS. 4A and 4B, respectively represent Scenarios 1, 2, and 3. Relative to the baseline trace BL, Scenario 1 (trace Sc1) illustrates a substantial decrease in peak current, while Scenarios 2 and 3 depict a corresponding increase in peak current relative to the baseline trace BL, with effectively the same maximum losses experienced in Scenario 2 (trace Sc2) as the baseline trace BL. Thus, the loss-based determination of when to transition from the first/low voltage level $V_L$ to the second/high voltage level $V_H$ operation of the RESS 11 may provide efficiency and performance advantages relative to sustained operation at the first/low voltage level $V_L$.

The controller 50 selects and implements the S-connected configuration according to a particular default speed-based torque and power operating profile, and possibly selects the S-connected configuration of FIG. 2B according to at least one additional speed-based torque and power operating profile in response to a detected fault or limit of the electric propulsion system 10 of FIG. 1. In such an embodiment, the default speed-based torque and power operating profile, e.g., FIG. 5, includes a higher peak power level and minimum torque level than the at least one additional speed-based torque and power operating profile, examples of which are shown in FIG. 6 or 7, which holds true across a predetermined speed range of the electric machine 12. FIGS. 6 and 7 likewise may correspond to a pair of such additional operating profiles, with FIG. 6 depicting a higher peak power level and minimum torque level than is depicted in FIG. 7.

Figure 5:
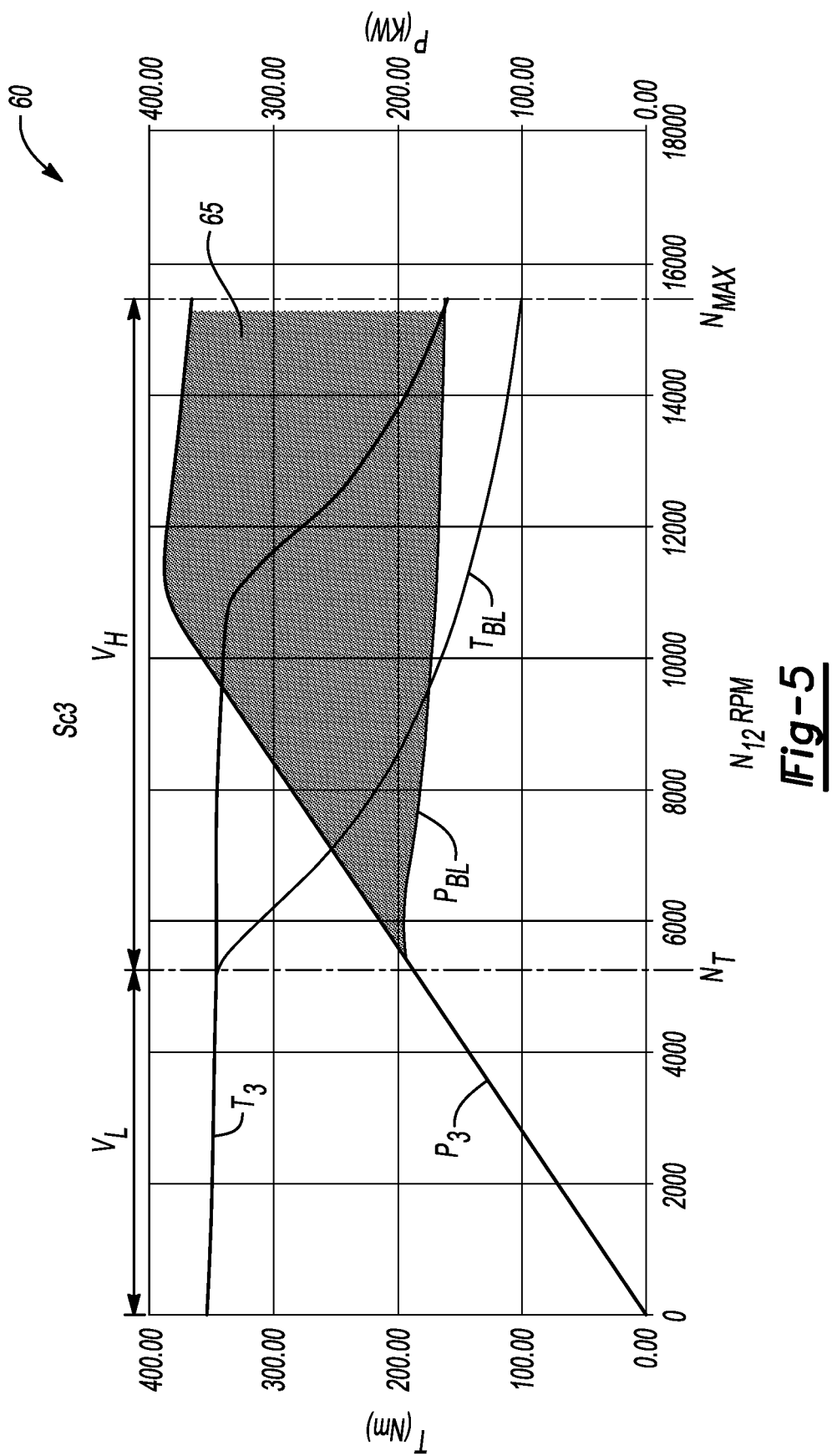
FIGS. 5-7 are exemplary optimal power-versus-speed and torque-versus-speed traces for the three illustrative scenarios depicted in FIGS. 4A-C.
Figure 6:
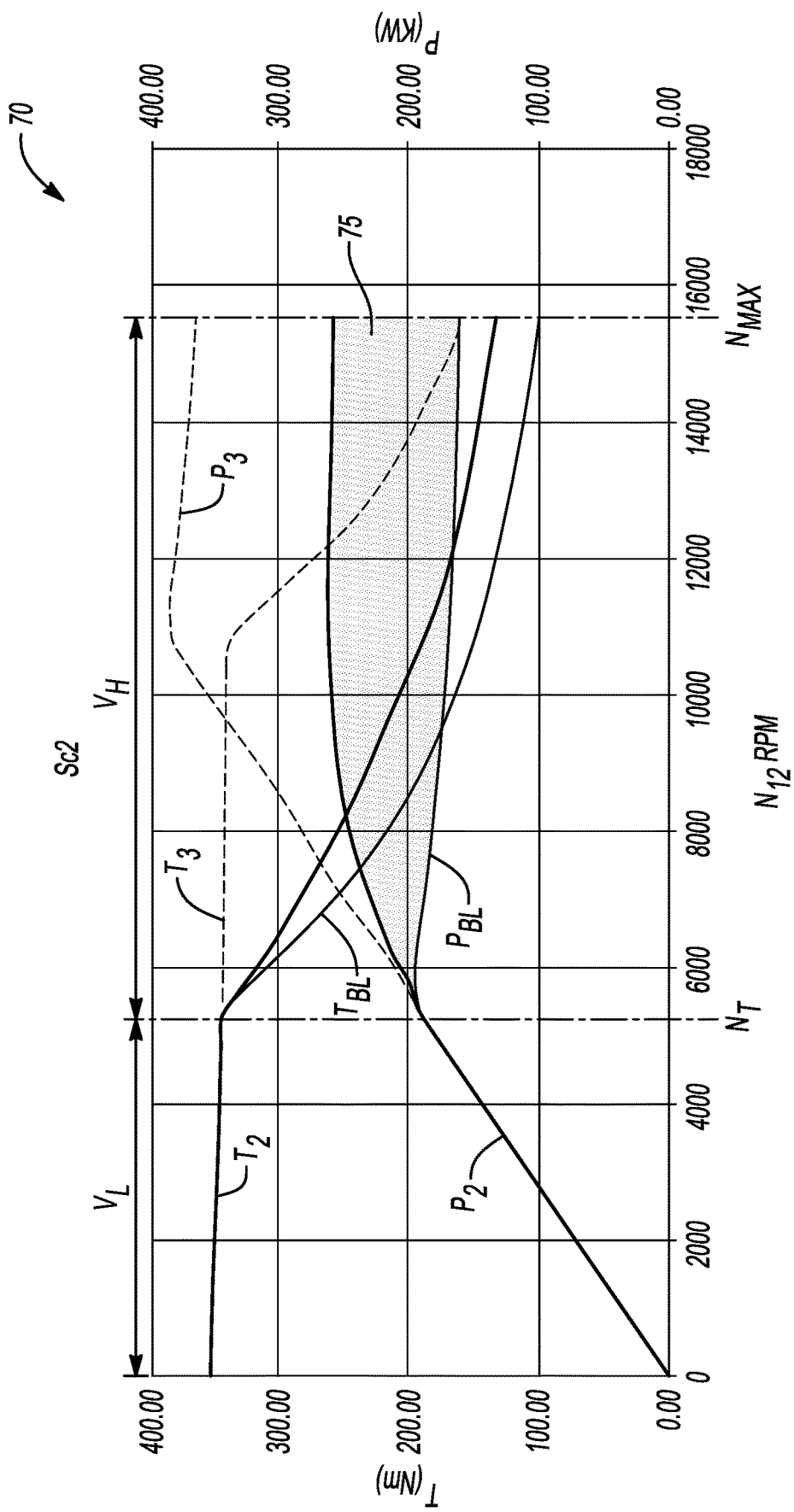
Figure 7:
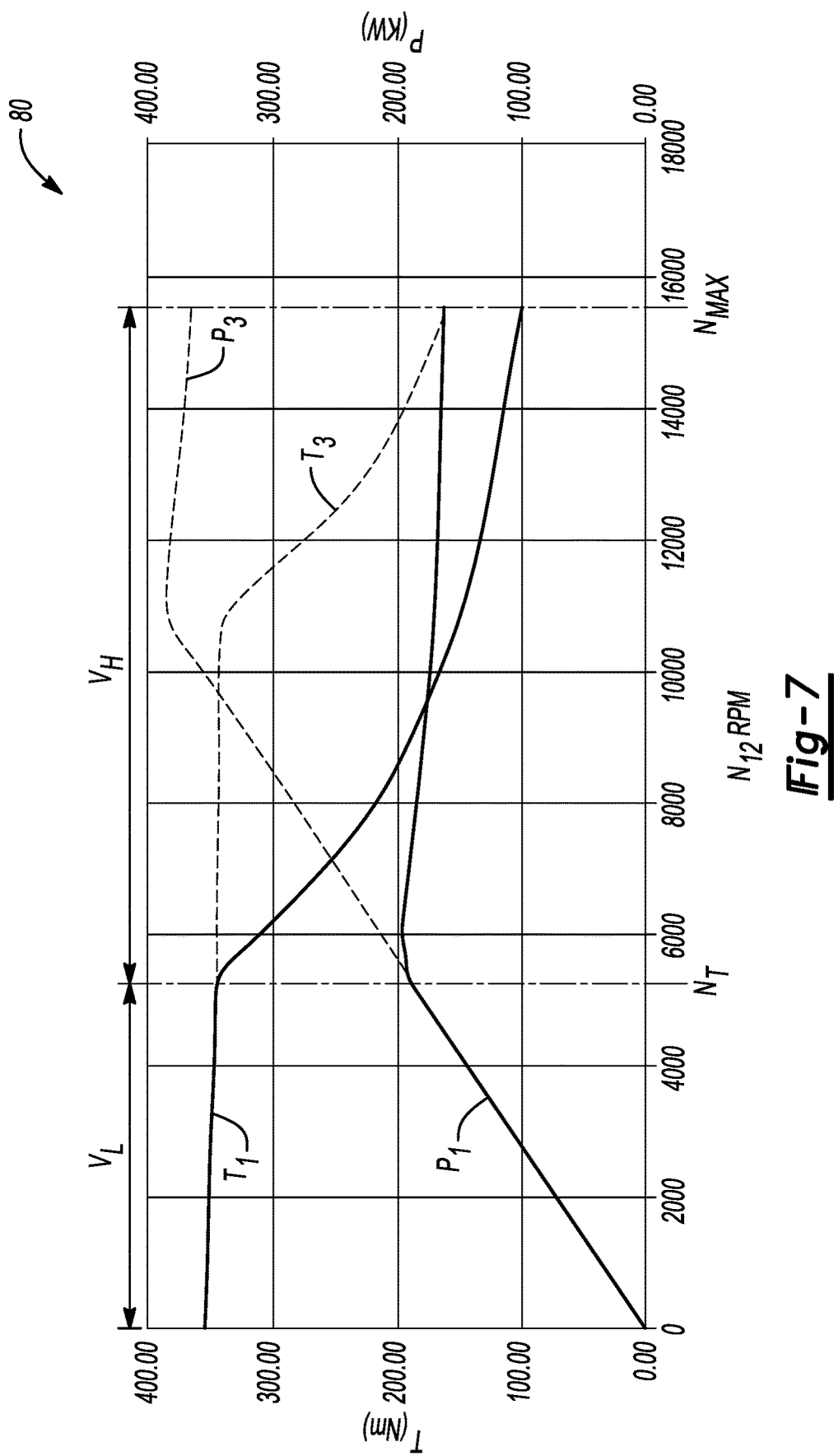

Scenarios 1, 2, and 3 may also be understood with reference to the torque-power-speed traces 60, 70, and 80 of respective FIGS. 5, 6, and 7. In the torque-power-speed traces 60 of FIG. 5, trace $T_{BL}$ and $P_{BL}$ are corresponding baseline torque and power traces for a representative P-connected configuration (FIG. 2A) providing the first/low voltage level $V_L$, which in this exemplary instance is about 350V. The baseline performance is also depicted in the torque-power-speed traces 80 of FIG. 7, i.e., Scenario 1 in which torque and power performance at the second/high voltage level $V_H$, e.g., about 700V, nominally, is similar to the baseline performance at a nominal voltage level of 350V, but runs more efficiently due to the effect of lowering flux-weakening losses. Peak current (not shown) provided at low speeds of the electric machine 12 is essentially the same for Scenarios 1, 2, and 3 and the baseline performance.

The S-connected configuration of FIG. 2B, which is nominally 700V in the present illustrative embodiment, offers torque and power boost capabilities at higher rotational speeds of the electric machine 12. Scenarios 3 and 2 are illustrated in FIGS. 5 and 6, respectively, using respective torque traces $T_3$ and $T_2$ and power traces $P_3$ and $P_2$. As will be appreciated by one of ordinary skill in the art in view of the present disclosure, the three operating scenarios of the present teachings could be implemented in three different hardware platforms.

For instance, in the second/high voltage level $V_H$ configuration the electric propulsion system 10 of FIG. 1 could use Scenario 1, shown in power-speed-traces 80 of FIG. 7, in which the RESS 11 is sized based on optimal low-speed torque in order to achieve improved efficiency/lower power losses at higher machine speeds. Such an embodiment of the electric propulsion system 10 would be able to produce about the same level of peak torque as the 350V baseline system, as can be seen by comparing FIGS. 5 and 7.

For example, under Scenario 2 of FIG. 6, a representative 700V embodiment of the RESS 11 (i.e., $V_H$=700V) could be produced using upgraded battery cells, i.e., battery cells having a high C-rate, in order to support higher-speed/higher-torque operations with improved efficiency levels relative to the baseline, and with higher torque and power capabilities. Shaded operating region 75 depicts such performance. Likewise, Scenario 3 of FIG. 5 could be implemented in the same nominal 700V example configuration using upgraded battery cells and a properly functioning/sized cooling system 11C, with the RESS 11 sized based and/or controlled to lowest peak high-speed losses in order to achieve optimal efficiency with higher torque and power relative to the baseline 350V system.

In a possible embodiment, the electric propulsion system 10 of FIG. 1 could be optionally configured for one of the three disclosed Scenarios, with memory (M) of the controller 50 flashed with a particular embodiment of the method 100 corresponding to the implemented hardware solution. For instance, a vehicle embodiment using a high-performance configuration of the electric propulsion system 10 may program the controller 50 to implement Scenario 3 of FIG. 5, which would enable optimal high-speed torque and power performance in operating region 65. Likewise, a vehicle using a high-efficiency embodiment of the electric propulsion system 10 may prefer optimal torque and power performance at low speeds, with the controller 50 of such a vehicle possibly programmed to operate according to Scenario 1 of FIG. 7 or Scenario 2 of FIG. 6. Thus, the loss-based decision on whether and when to transition between the modes of FIGS. 2A and 2B would occur in such an embodiment according to one of the torque-power-speed traces 60, 70, or 80.

Alternatively, the electric propulsion system 10 of FIG. 1 may be configured to operate in Scenario 3 of FIG. 5 as a default mode, with the controller 50 selectively implementing Scenarios 2 or 1 in response to detecting an operating load or fault-based performance limitation of the RESS 11 and/or the cooling system 11C. For instance, the controller 50 may implement Scenario 2 in the face of a detected fault or limitation in the cooling system 11C alone, and may implement Scenario 1 in response to a detected fault or limitation in the RESS 11. In such an embodiment, the controller 50 would progressively limit the high-speed torque and power performance of the electric powertrain 10 as needed in response to the above-noted faults or limitations. The various embodiments described herein require construction of hardware components rated for the high voltage level $V_H$, as will be appreciated, with overall control of the switching operation of the RESS 11 and operation of the electric machine 12 maintained during transitions between the P-connected and S-connected configurations to minimize driveline disturbances and current transitions.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The invention claimed is:

1. An electric propulsion system comprising:
    a polyphase rotary electric machine configured to impart torque to a load;
    a traction power inverter module ("TPIM") connected to the electric machine;
    a reconfigurable energy storage system ("RESS") connected to the TPIM and having multiple battery modules and a switching circuit, wherein the battery modules are selectively connectable, via operation of the switching circuit, in a parallel-connected ("P-connected") configuration at a first/low battery voltage level and a series-connected ("S-connected") configuration at a second/high battery voltage level that exceeds the first/low battery voltage level; and
    a controller programmed with a predetermined power loss of the electric propulsion system at the first/low battery voltage level and the second/high battery voltage level, respectively, wherein the controller is configured to receive a commanded output torque and a commanded output speed of the electric machine, and to select the S-connected configuration or the P-connected configuration based on the predetermined power loss, the commanded output torque, and the commanded output speed.

2. The electric propulsion system of claim 1, wherein the controller is configured to select the S-connected configuration or the P-connected configuration based at least in part on whether the commanded output speed exceeds a calibrated baseline speed above which an actual output torque of the electric machine decreases toward a minimum torque value.

3. The electric propulsion system of claim 2, wherein the controller is configured to select the S-connected configuration when the commanded output speed exceeds the baseline speed and the commanded output torque is less than a calibrated maximum torque at the second/high voltage level.

4. The electric propulsion system of claim 3, wherein the controller is configured to select the P-connected configuration when the baseline speed exceeds the commanded output speed, the calibrated maximum torque exceeds the commanded output torque, and the predetermined power loss at the first/low voltage level of the P-connected configuration is less than the predetermined power loss at the second/high voltage level of the S-connected configuration.

5. The electric propulsion system of claim 1, wherein the controller is configured, absent a fault or a limitation of the electric propulsion system, to select the S-connected configuration according to a default speed-based torque and power operating profile.

6. The electric propulsion system of claim 5, wherein the controller is configured, in response to the fault or limitation of the electric propulsion system, to select the S-connected configuration according to at least one additional speed-based torque and power operating profile, and wherein the default speed-based torque and power operating profile includes a higher peak power level and minimum torque level than the at least one additional speed-based torque and power operating profile across a predetermined speed range of the electric machine.

7. The electric propulsion system of claim 5, further comprising:
    a cooling system configured to regulate temperature of the electric machine and associated power electronics, wherein the fault or limitation of the electric propulsion system includes a fault or limitation of the cooling system.

8. The electric propulsion system of claim 7, wherein the at least one additional speed-based torque and power operating profile includes first and second additional speed-based torque and power operating profiles, the first additional speed-based torque and power operating profile having a higher peak power level and minimum torque level than the second additional speed-based torque and power operating profile, and wherein the electric machine operates according to the first additional speed-based torque and power operating profile in response to the fault or limitation of the cooling system, and according to the second additional speed-based torque and power operating profile in response to a fault or limitation of the RESS.

9. The electric propulsion system of claim 1, wherein the first/low voltage level is at least 250V to 400V and the second/high voltage level is at least 500V to 800V.

10. The electric propulsion system of claim 1, wherein the load includes a set of road wheels connected to the electric machine.

11. A method for optimizing a drive operation of an electric propulsion system having a polyphase rotary electric machine configured to impart motor torque to a load, a traction power inverter module ("TPIM") connected to the electric machine, and a reconfigurable energy storage system ("RESS") connected to the TPIM and having multiple battery modules, wherein the battery modules are selectively connectable, via operation of a switching circuit, in a parallel-connected ("P-connected") configuration to provide a first/low battery voltage level and a series-connected ("S-connected") configuration to provide a second/high battery voltage level that exceeds the first/low battery voltage level, the method comprising:
  receiving, via a controller, a commanded output torque and commanded output speed of the electric machine;
  determining a predetermined power loss of the electric propulsion system, via the controller, at the first/low voltage level and the second/high voltage level, respectively; and
  selectively transitioning the electric propulsion system to the S-connected configuration or P-connected configuration, via control of the switching circuit using the controller, based on the predetermined power loss, the commanded output torque, and the commanded output speed.

12. The method of claim 11, the method further comprising:
  selecting the S-connected configuration or the P-connected configuration via the controller based at least in part on whether the commanded output speed exceeds a calibrated baseline speed above which an actual output torque of the electric machine decreases toward a minimum torque value.

13. The method of claim 12, the method further comprising:
  selecting the S-connected configuration when the commanded output speed exceeds the baseline speed and the commanded output torque exceeds a calibrated maximum torque at the second/high voltage level.

14. The method of claim 13, the method further comprising:
  establishing the P-connected configuration when the baseline speed exceeds the commanded output speed, the commanded output torque is less than the calibrated maximum torque, and the power loss at the first/low voltage level is less than the power loss at the second/high voltage level.

15. The method of claim 11, the method further comprising:
  absent a fault or a limitation of the electric propulsion system, selecting the S-connected configuration, via the controller, according to a default speed-based torque and power operating profile.

16. The method of claim 15, the method further comprising:
  selecting the S-connected configuration according to at least one additional speed-based torque and power operating profile in response to a fault or limitation of the electric propulsion system, wherein the default speed-based torque and power operating profile includes a higher peak power level and minimum torque level than the at least one additional speed-based torque and power operating profile across a predetermined speed range of the electric machine.

17. The method of claim 16, wherein the electric propulsion system includes a cooling system configured to regulate temperature of the RESS, and wherein the fault or limitation of the electric propulsion system includes a fault or limitation of the cooling system.

18. The method of claim 17, wherein the at least one additional speed-based torque and power operating profile includes first and second additional speed-based torque and power operating profiles, and the first additional speed-based torque and power operating profile having a higher peak power level and minimum torque level than the second additional speed-based torque and power operating profile, the method comprising:
  operating the electric machine according to the first additional speed-based torque and power operating profile in response to the fault or limitation of the cooling system; and
  operating the electric machine according to the second additional speed-based torque and power operating profile in response to a fault or limitation of the RESS.

19. The method of claim 11, wherein the first/low voltage level is at least 250V to 400V and the second/high voltage level is at least 500V to 800V.

20. The method of claim 11, wherein the load includes a set of road wheels connected to the electric machine, the method further comprising:
  powering the set of road wheels via the electric machine.

* * * * *